Patented Jan. 16, 1940

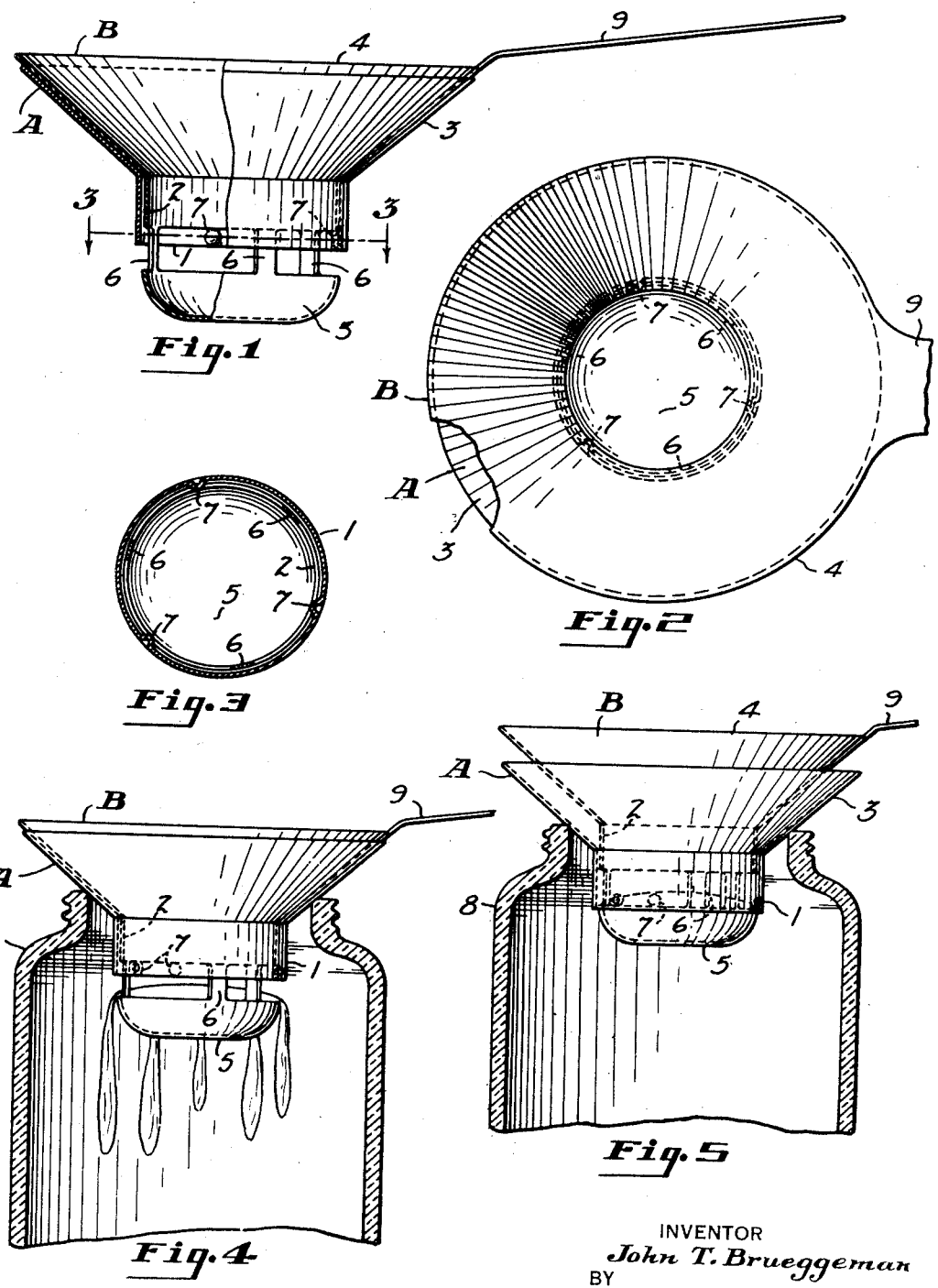

2,187,488

UNITED STATES PATENT OFFICE 2,187,488

EGG SEPARATOR

John T. Brueggeman, Shaker Heights, Ohio

Application December 3, 1937, Serial No. 177,848

4 Claims. (Cl. 146—2)

This invention relates to separators, and in particular to an improved type of egg separator for separating the whites from the yolks of eggs.

It is an object of the present invention to provide an egg separator which is simple in design and construction, and which may be readily and economically manufactured.

Another object of the invention is to provide an egg separator which is efficient and easy to operate.

It is a further object of the present invention to provide an egg separator composed of two parts, which will remain together, but which may be easily cleaned and kept in a sterilized condition.

Another object is to provide a separator comprising two separate parts, one of which supports the other, the assembled parts of the separator adapted to receive the insides of an egg and automatically separate the white from the yolk, the white being released from the separator to drop into a receptacle supporting the separator and the yolk being retained by the separator, and the parts of the separator being adapted to cooperatively sever portions of the white adhering to the yolk.

Other objects and advantages will become apparent from the following detailed description of the present invention, accompanied by the drawing, in which:

Figure 1 is an elevational view, partly in section, of a separator embodying the present invention;

Fig. 2 is a plan view of the separator, enlarged to show details thereof;

Fig. 3 is a sectional view, taken substantially on the line 3—3 of Fig. 1;

Fig. 4 is an elevational view, showing an egg just broken in the separator; and

Fig. 5 is a view similar to Fig. 4, showing the separator after the white has been separated from the yolk of the egg.

Briefly, the present invention comprises an outer member and an inner member, which fit together to form the separator. The outer member has a cylindrical sleevelike portion which embraces and has sliding engagement with a cylindrical portion of the inner member, the latter having means for retaining the egg yolk while releasing the egg white, and the inner and outer members having edge portions movable relative to one another for severing parts of the egg which adhere to the yolk.

Referring to the drawing by numerals of reference, in which like parts bear the same numbers throughout the several views, it may be seen that the separator comprises parts A and B, which have telescopic sliding engagement with one another, a cylindrical shell or skirt portion 1 of the part A embracing a similarly shaped portion 2 of the part B. Formed at one end of the skirt 1 is an inverted frusto-conical top 3, which may be disposed on any suitable receptacle. The inner member B is generally similar in shape to the outer member A and has an inverted frusto-conical portion 4 formed at one end of the cylindrical portion or skirt 2, which is slightly smaller in diameter than the portion 3 of the outer member A. At the other end of the skirt 2 the member B is provided with a bowl 5, substantially the size of an egg yolk, and this bowl may be secured to the skirt 2 of the member B by a plurality of straps 6. Preferably, the straps 6 and the bowl 5 are an integral portion of the inner member, but these parts may be separate and attached to the member B in any suitable manner. When the members are in their normal, assembled position, as shown in Fig. 1, the inner member B is supported on the outer member A by engagement of the lower edge of the skirt 2 on a plurality of lugs 7 carried by the skirt 1 of the member A. In this illustration the lugs 7 are produced by depressing the outer surface of the skirt 1, indenting the same, and producing embossed portions or lugs on the interior of the skirt 1, as shown in Fig. 3. Support of the inner member on the outer member may be afforded by other means, as, for example, the bottom edge of the cylindrical portion of the outer member may be turned inwardly to provide a support for the bottom edge of the cylindrical portion of the inner member.

Preferably, there is provided on the member B a suitable handle 9, so that the separator may be easily grasped, the handle being in this case integral with the portion 4, and extending from the top edge thereof. However, it is to be understood that the handle may be a separate piece and attached to the member B in any suitable manner.

The operation of this device is substantially as follows:

With the device in its assembled position, it may be placed in position on the top of a suitable receptacle, such as a jar 8, as shown in Figs. 4 and 5. The egg is broken over the device and will fall into the inner member, where the yolk will be retained by the bowl 5 while the white of the egg will pass through the openings between the straps 6, as shown in Fig. 4. Then the inner member may be raised by means of a suitable handle 9, which movement will slide the inner member upwardly with respect to the outer member, and by cooperation between the lower edge of the cylindrical portion 1 and the upper edge of the bowl 5 a shearing action is produced which will cut off any white of the egg that may be suspended from the side of the bowl 5. When the separator is lifted by the handle 9 the inner and outer members will maintain their established relation, as shown in Fig. 5, and the device may be removed from the jar 8 and the yolk deposited in another suitable receptacle.

Thus, it may be seen that by the use of this device the whites of eggs may be separated from the yolks quickly and thoroughly, and, by picking up the handle on the inner member, the white adhering to the yolk, and suspended from the bowl, is automatically cut off. By use of an outer member having a conical portion to rest on the receptacle, receptacles may be used having mouth openings which vary in size, and this device may be readily used with each receptacle. Also, there is a continuous line support around the mouth or opening of the receptacle, which engagement may have a tendency to retain the device more rigidly on the receptacle.

It is to be understood that details of the construction of the device embodying the present invention are shown merely for purposes of illustration and explanation, and that various modifications may be made without departing from the spirit of the invention as defined in the appended claims.

What I claim is:

1. A device for separating the whites from the yolks of eggs which comprises an outer member having an inverted frusto-conical shaped portion surmounting a cylindrical portion and adapted to be positioned on a receptacle, an inner member having an inverted frusto-conical shaped portion surmounting a cylindrical portion and provided with a bowl depending from said cylindrical portion and normally extending below the lower end of the outer cylindrical portion to receive an egg yolk, said inner member disposed inside and normally resting on said outer member and being provided with openings in the cylindrical portion adjacent the bowl to permit egression of the egg white, said members arranged for movement relative to each other whereby egg white suspended from the inner member will be automatically sheared off and the openings of the inner member will be sealed.

2. An egg separator comprising an inner member and an outer member, each of said members provided with a cylindrical portion, the outer member having means for supporting the separator on the receptacle, the inner member movable with respect to the outer member and normally supported thereby, the cylindrical portion of said inner member disposed inside the cylindrical portion of the outer member, a bowl depending from said inner member and normally disposed below the cylindrical portion of the outer member, said bowl having edge portions which cooperate with edge portions of the cylindrical portion of the outer member to shear egg whites suspended from the bowl upon raising the bowl with respect to the outer member.

3. A device for separating the whites from the yolks of eggs which comprises an outer member adapted to rest on a receptacle and provided with a plurality of projections on its interior near the lower edge thereof, an inner member provided with a bowl to receive egg yolks normally disposed below the lower edge of the outer member and having openings to permit egression of the egg white, the lower edge of said outer member and upper edge of said bowl being movable relative to each other whereby upward movement of the inner member first shears off the egg white suspended from the bowl and further movement causes the inner member to support the outer member by the projections thereof.

4. A device for separating the whites from the yolks of eggs which comprises an inner receiving member having a receptacle for egg yolks and openings to permit egression of the egg white, an outer member having a cylindrical portion disposed around the inner member, and protrusions extending inwardly from the cylindrical portion next the lower edge thereof, said receptacle being normally disposed below the lower edge of said cylindrical portion, said members arranged for movement relative to each other so that lifting the inner member automatically causes the lower edge of the outer member to shear egg whites suspended from the openings through the inner member and to seal the openings of the inner member, and further lifting of the inner member raises the outer member by engagement of the inner member with said protrusions.

JOHN T. BRUEGGEMAN.